US009323774B2

(12) United States Patent
Dally

(10) Patent No.: US 9,323,774 B2
(45) Date of Patent: Apr. 26, 2016

(54) COMPRESSED POINTERS FOR CELL STRUCTURES

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 448 days.

(21) Appl. No.: 13/887,216

(22) Filed: May 3, 2013

(65) Prior Publication Data

US 2014/0330796 A1   Nov. 6, 2014

(51) Int. Cl.
*G06F 17/30* (2006.01)
(52) U.S. Cl.
CPC ................ *G06F 17/30153* (2013.01)
(58) Field of Classification Search
CPC .................................................. G06F 17/30153
See application file for complete search history.

(56) References Cited

U.S. PATENT DOCUMENTS

| 2003/0060216 | A1* | 3/2003 | Kamel | H04L 12/185 455/457 |
| 2005/0219075 | A1* | 10/2005 | Storer | H03M 7/3086 341/51 |
| 2007/0136607 | A1* | 6/2007 | Launchbury | G06F 12/1408 713/190 |
| 2007/0276794 | A1* | 11/2007 | Nishiyama | H03M 7/30 |
| 2012/0265931 | A1 | 10/2012 | Cheriton | |

OTHER PUBLICATIONS

Lattner, C. et al., "Transparent Pointer Compression for Linked Data Structures," Proceedings of the ACM Workshop on Memory System Performance (MSP'05), Jun. 2005, pp. 1-12.
Examination Report from German Patent Application No. 10 2014 105 741.4, dated Mar. 12, 2015.

* cited by examiner

*Primary Examiner* — Kris Mackes
(74) *Attorney, Agent, or Firm* — Zilka-Kotab, PC

(57) ABSTRACT

A system and method are provided for representing pointers. An encoding type for a pointer structure referenced by a first cell of a data structure is determined. A first field of the pointer structure is encoded to indicate the encoding type. Further, a second field of the pointer structure is encoded according to the encoding type to indicate a location in memory where a cell structure corresponding to a second cell of the data structure is stored.

21 Claims, 10 Drawing Sheets

**Another Cell in The Sub-Region: Address =
sub-region base + index*record_size**

**Outside of the Sub-Region: Address =
pointer table[pointer_array_base +index*8]**

**Outside of the Sub-Region: Address =
neighbor_Sub-Region base + neighbor_index*record_size,
where neighbor_sub-region base = neighbor base[identifier]**

COMPRESSED POINTERS FOR CELL STRUCTURES

FIELD OF THE INVENTION

The present invention relates to pointers to point to locations in memory, and more specifically to compressing pointers.

BACKGROUND

Recently as the virtual and/or physical address space that can be accessed by an application program has increased, the size of a conventional address has increased from 32 bits to 64 bits. As a result, the pointers that are used to reference the address space have also doubled in size. When pointers are stored in caches, memory, and/or registers, the capacities of the caches, memory, and/or registers may also need to increase. Additionally, the amount of bandwidth that is consumed to access and transfer the pointers also increases. The energy required to transfer these pointers increases as well.

Thus, there is a need for reducing the amount of storage consumed by pointers and/or addressing other issues associated with the prior art.

SUMMARY

A system and method are provided for representing a pointer. An encoding type for a pointer structure referenced by a first cell of a data structure is determined. A first field of the pointer structure is encoded to indicate the encoding type. Further, a second field of the pointer structure is encoded according to the encoding type to indicate a location in memory where a cell structure corresponding to a second cell of the data structure is stored.

DETAILED DESCRIPTION

In accordance with one possible embodiment, the memory capacity required to hold and the memory bandwidth, and hence energy, required to access complex pointer structures may be reduced by exploiting the locality in common data structures to compress the pointers during program execution. Application programs that are configured to process data organized in a three-dimensional data structure, such as a grid structure (e.g. fluid analysis, finite-element analysis, etc.) spend a large fraction of the storage space allocated to the application program and bandwidth manipulating the pointers that represent the grid structure. For large grid structures, the pointers are 64-bit entities. By exploiting the locality inherent in the three-dimensional space in which the grid structure is embedded, many of the pointers can be represented with a reduced number of bits, e.g., 1.6 bits. Pointer compression and decompression can be completely implemented in software. However, gains in efficiency can be realized when hardware circuitry is configured to natively interpret compressed pointers. The above features may or may not be exploited in the context of the various embodiments set forth below. While described in relation to three-dimensional data structures, one of skill in the art will understand that the techniques presented here apply to arbitrary data structures, including graphs, as long as those structures exhibit some locality so they can be partitioned into sub-regions with most pointers local to a sub-region.

Figure 1:
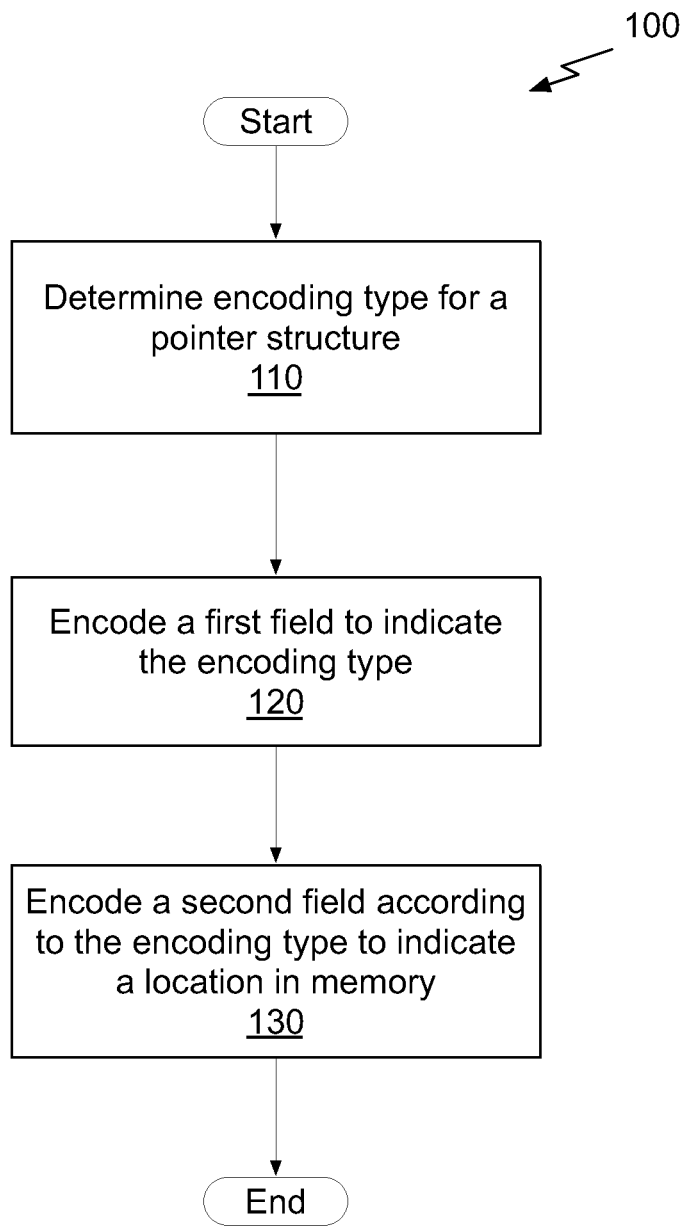
FIG. 1 illustrates a flowchart of a method for representing a pointer, in accordance with one embodiment.

FIG. 1 illustrates a flowchart 100 of a method for representing a pointer, in accordance with one embodiment. At operation 110, an encoding type for a pointer structure referenced by a first cell of a data structure is determined. In the context of the present description, a data structure may be a graph structure or an irregular grid, where an irregular grid differs from a regular grid in that the cells making up the grid are not all necessarily uniform in size. In some possible embodiments, the locations of different cells within the irregular grid cannot necessarily be easily determined, so pointers are used to locate neighboring cells. At operation 120, a first field of the pointer structure is encoded to indicate the encoding type. At operation 130, a second field of the pointer structure is encoded according to the encoding type to indicate a location in memory where data corresponding to a second cell of the data structure is stored.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
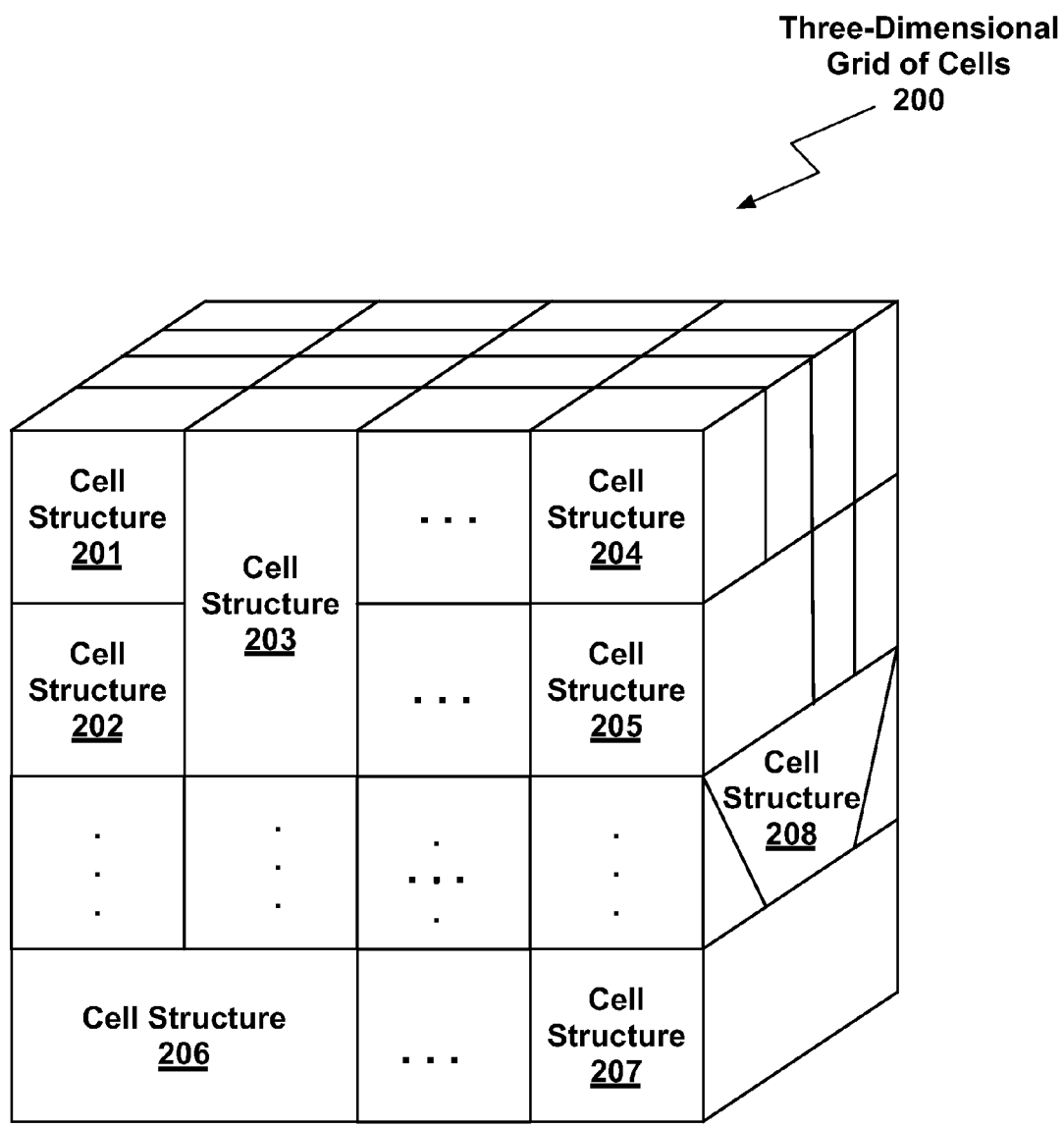
FIG. 2A illustrates a three-dimensional grid of points, in accordance with one embodiment.

FIG. 2A illustrates a three-dimensional (3D) grid of cells 200, in accordance with one embodiment. A data structure that is represented by a 3D grid of cells 200 is stored as an "array of structures" (AoS). In one embodiment, each cell is represented by a cell structure (e.g. cell structure 201, 202, 203, 204, 205, 206, and 207) that contains data that is specific to the point x, y, and z coordinates, pressure, temperature, etc., and an array of pointers to neighboring cell structures in the 3D grid of cells 200. In a regular three-dimensional grid of points, each cell structure 201 has six neighbors, one for each face of the cell. In an irregular grid, such as the 3D grid of cells 200, each cell structure may have fewer than, more than, or six neighbors. For example, the cell structure 203 has six or seven neighbors and the cell structure 207 has between five and eight neighbors. A cell structure may also be an arbitrary shape bounded by flat surfaces (e.g., polyhedral), such as the cell structure 208. In various embodiments, the irregular grid may be particularly well-suited for representing disparate field data where some regions have very high variation and other regions of the 3D space have low variation, such as occurs in computational fluid dynamics.

In the context of the present embodiment, each cell is represented by a cell structure that contains six 8 Byte words of data that is specific to the point and an array of up to eight pointers to neighboring cell structures in the three-dimensional grid of cells 200. Without compression, each cell structure contains a total of 112 Bytes—six 8 Byte words of data and eight 8 Byte pointers to adjacent points. If fewer than eight pointers are needed, the unused pointers are each set to a value of NULL. If more than eight pointers are needed, the last pointer is set to a distinguished value that encodes a pointer to an overflow list.

Because the pointer structures are embedded in a 3D space, there is considerable locality between the cell structures. The cell structures may be partitioned into sub-regions or 'cubes' of 3D space that are $2^n$ cells on a side. The bulk of the cell structures for cells within a sub-region store pointers in the point array that are directed to other cell structures within the same sub-region. For example, in a regular cubic grid that includes a total of the $6 \times 2^{3n}$ pointers, all but $6 \times 2^{2n}$ of the pointers are local. The rate of the non-local pointers in a regular cubic grid is $2^{-n}$.

The pointer locality may be exploited by representing most pointers with a reduced number of bits. Consider a 3D data structure, such as a grid or graph structure that is partitioned into sub-regions of at most 32 k cells. Each sub-region includes of a set of cell structures that each include a pointer array of up to eight pointers. For example, in one embodiment, a cell structure includes four pointer structures A, B, C, and D; where A and C encode pointers to other cell structures that are within the same sub-region. The most-significant-bit (MSB) of each pointer structure is a first field that indicates the encoding type of the pointer structure. When the MSB is zero, the pointer structure is 16 bits where a second field includes 15 bits that specify an index. The pointer structures representing A and C are each two bytes. The pointer (address) to another cell structure in the same sub-region, such as pointer structures A and C, can be calculated as address=sub_region_base+index*cell_size where the cell_size is the amount of storage consumed by each cell structure and the sub_region_base is a base address for the sub-region.

The size of the pointer structures representing B and D are larger compared with the pointer structures representing A and C. Therefore, the first field indicates a size of the second field, i.e., the number of bits in the second field. B and D encode pointers that are outside of the sub-region and have an MSB of one in the first field indicating that the second field stores the pointer as a 63 bit address. The pointer structures representing B and D are each eight bytes. The pointer structures for A, B, C, and D are stored in memory as 20 bytes:

A1, A0, B7, B6, B5, B3, B2, B1, B0, C1, C0, D7, D6, D5, D4, D3, D2, D1, D0

In another embodiment, each of the pointer structures may be encoded using fewer bits than are needed to represent an address (e.g., 16 instead of 64 hits) where a first field encodes the type. Each pointer structure may be the same size, e.g., two bytes. When a single hit is used to encode the type, a zero in the first field may indicate that a second field (e.g., the remaining 15 bits) encodes an index corresponding to a particular cell structure within the same sub-region, as previously described.

When dereferencing a pointer in the cell structure, the address may be calculated as address=sub_region_base+index*record_size where the record_size is the amount of storage consumed by each cell structure. The addition operation may be simplified when the sub_region_base is restricted to be aligned to even boundaries.

When a one is encoded in the first field as the type, the second field stores an index into a pointer table that stores pointers corresponding to addresses that are outside of the current sub-region and the address is calculated via an indirection through the pointer table as:

address=Pointer Table[pointer_array_base+index*8]

where the pointer_array_base is the base address of the pointer table and each entry in the pointer table is 8 bytes (64-bits), For a regular grid or an irregular grid with 3D locality, typically 96.9% of the pointers may be encoded in a compressed format, such as the 16-bit representation, leaving only 3.1% of the pointers to be encoded using the full address resolution (e.g., 64 bits) via the pointer table. Using a combination of compressed formats to represent pointers in the pointer array results in an average pointer length of 17.5 bits (or a 3.6× compression rate).

Figure 2B:
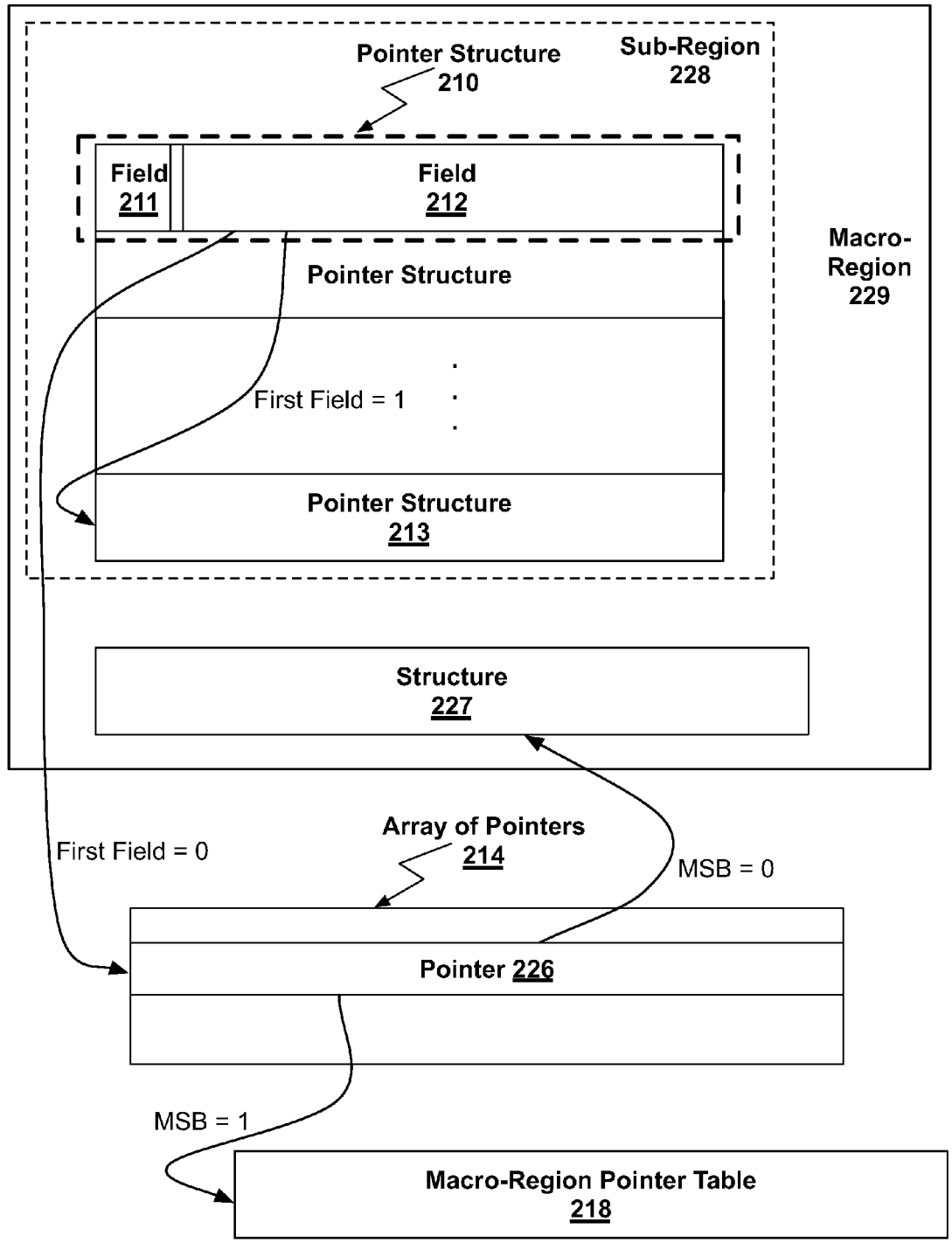
FIG. 2B illustrates different encoding for a region structure with hierarchy, in accordance with one embodiment.

The compressed pointer technique may be extended to a structure having multiple levels of hierarchy. For example, in addition to a sub-region level of hierarchy, the sub-regions may be organized into macro-regions forming a level of hierarchy between the sub-region and the grid. FIG. 2B illustrates different encoding for a region structure with hierarchy, in accordance with one embodiment. A sub-region 228 at a first level of hierarchy is included within a macro-region 229 at a second level of hierarchy that includes neighboring sub-regions (not shown) of the sub-region 228. In the context of the following example, each pointer structure 210 is 16 bits, as previously described. The pointer structure 210 includes a first field 211 that may be a single bit and a second field 212 that includes the remaining bits of the pointer structure 210. When a one is encoded in the first field 211, the second field 212 stores an index corresponding to a pointer structure 213 in the current sub-region 228 (as described above). When a zero is encoded in the first field 211, the index in the second field 212 corresponds to a pointer within an array of 32-bit pointers 214 (with the index being multiplied by 4 to index into the array of 32-bit pointers). As shown in FIG. 2B, the index corresponds to a pointer 226 in the array of pointers 214. If the 32-bit pointer 216 has a MSB of zero, the 32-bit pointer 226 is used to index a cell structure 227 in the macro-region 229 (of $2^{31}$ cell structures) that includes the sub-region 228. When the MSB of the 32-bit pointer is a one, the 32-bit pointer is used to index into a macro-region pointer table 218 of 64-bit uncompressed pointers.

With additional levels of hierarchy provided by the macro-region, of the 3.1% of pointers that are not within the sub-region, only 3.1% (0.097% of all pointers) are also outside of the macro-region. Use of a combination of compressed formats to represent pointers in sub-regions and macro-regions results in an average pointer length of 16.6 bits.

In another embodiment, hierarchical compression can be used to encode the pointers, where the top two bits of a compressed pointer encode a compressed pointer length in a prefix manner. In the context of the present embodiment, a compressed pointer having a MSB of zero may indicate that 16 bits encode the compressed pointer, so that 15 bits represent the decompressed pointer. When the top two MSBs of a compressed pointer are one and zero, 32 bits encode the compressed pointer and 30 bits represent the decompressed pointer. When the top two MSBs of the compressed pointer are one and one, 64 bits encode the compressed pointer and 62 bits represent the decompressed pointer. With this type of hierarchical compression, the compressed pointers vary in size as 16 bits, 32 bits, and 64 bits.

Figure 2C:
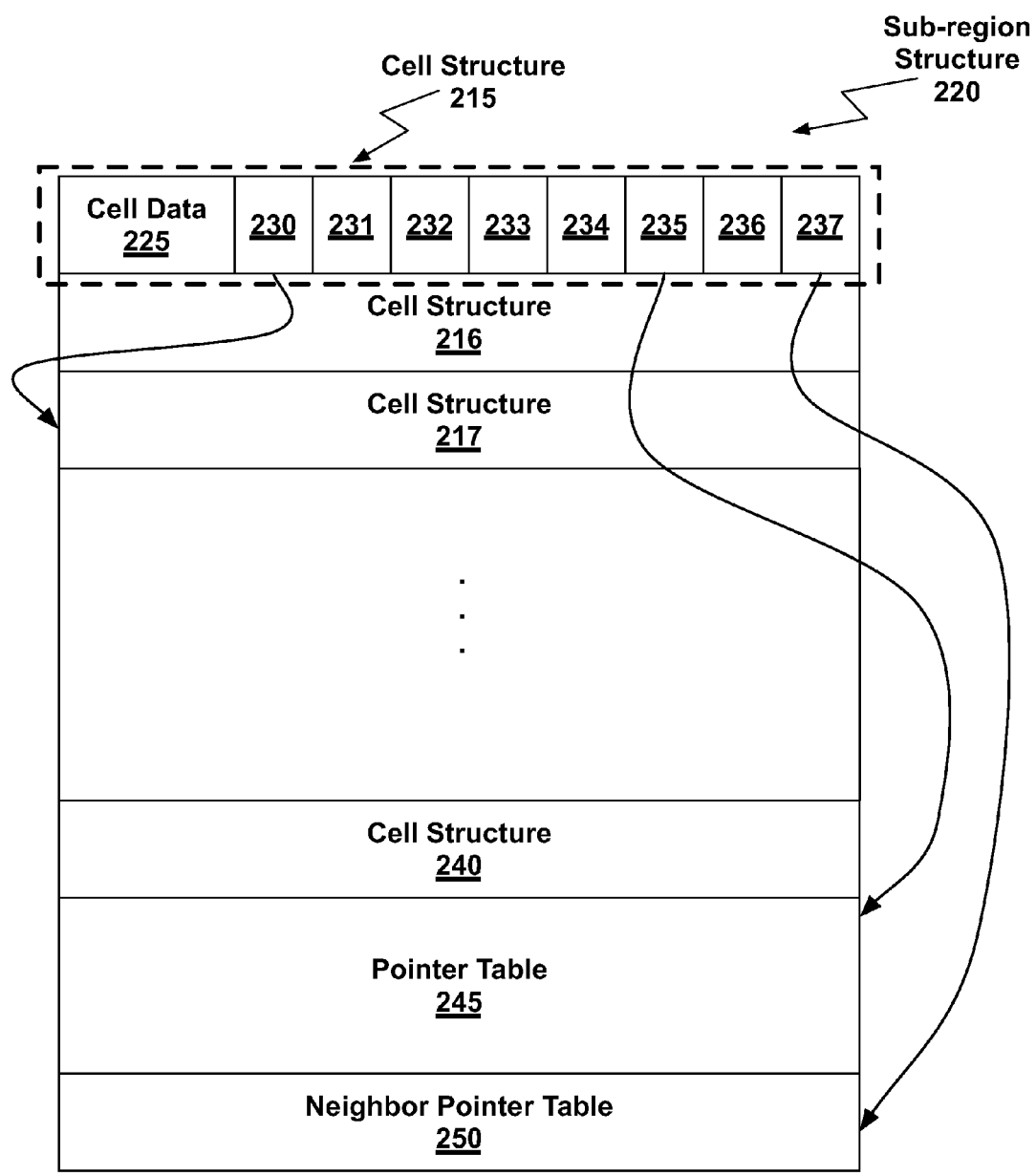
FIG. 2C illustrates a sub-region structure, in accordance with one embodiment.

FIG. 2C illustrates a sub-region structure 220, in accordance with one embodiment. The sub-region structure 220 includes a cell structure for each cell in the sub-region (e.g., cell structures 215, 216, 217, through 240). As previously explained, each cell structure, such as the cell structure 215, stores cell data 225 that is specific to the cell and an array of up to eight pointer structures (230, 231, 232, 233, 234, 235, 236, and 237) directed to neighboring cell structures in the 3D grid of points. The pointer structure 230 within the cell structure 215 is encoded to point to another cell structure within the sub-region structure 220, namely the cell structure 217. Therefore, the pointer structure 230 stores an index corresponding to the location of the cell structure 217 in the second field. The pointer structure 235 within the cell structure 215 is encoded to point to a cell structure that is outside of the sub-region structure 220. Therefore, the pointer structure 235 stores an index corresponding to an entry of the pointer table 245 in the second field. The pointer structure 237 within the cell structure 215 is encoded to point to a cell structure within a neighboring sub-region structure. Therefore, the pointer structure 237 stores an index corresponding to an entry of a neighbor pointer table 250 in the second field. Because there are three different encodings for the second field, the first field includes two bits.

Figure 2D:
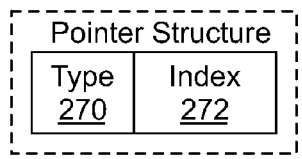
FIG. 2D illustrates three different encodings for a cell in the sub-region structure shown in FIG. 2C, in accordance with one embodiment.
Figure 2D:
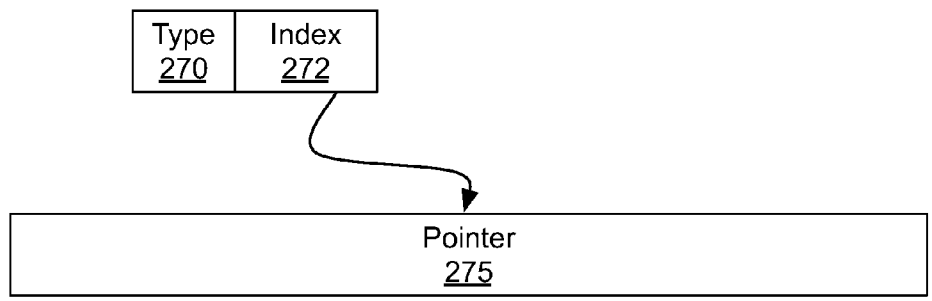
Figure 2D:
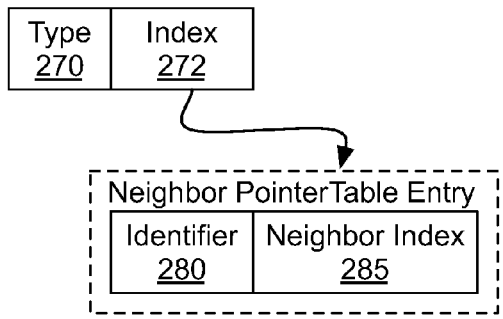

FIG. 2D illustrates three different encodings for a cell structure 215 representing a cell in the sub-region structure 220 shown in FIG. 2C, in accordance with one embodiment. As previously described, each pointer structure includes two fields. A first field stores a type 270 that indicates the encoding type. The second field is encoded with an index 272 according to the encoding type 270 to indicate a location in memory where a second pointer structure is stored.

When the first field stores an encoding type that indicates that the second pointer structure is within the same sub-region as the pointer structure, the address of the location in memory is computed as:

address=sub_region_base+index*record_size.

When the first field stores an encoding type that indicates that the second pointer structure is outside of the sub-region and is stored in uncompressed form in the pointer table 245, the address of the location in memory is computed by reading the uncompressed pointer to the location in memory from the pointer table, as follows:

address=Pointer Table[pointer_array_base+index*8]

When the first field stores an encoding type that indicates that the second pointer structure is outside of the sub-region and is stored in a compressed form in the neighbor pointer table 250, the address of the location in memory is computed by reading an entry from the neighbor pointer table 250 that includes an identifier 280 for the particular neighboring sub-region and a neighbor index 285. The base address of the neighboring sub-region (neighbor_sub-region base) is determined using the identifier 280 and the address is computed as:

address=neighbor_sub-region base+neighbor index*record_size]

The encoding of pointers into a compressed format and decompression of pointers represented in the compressed format may be implemented entirely in software, in one optional embodiment. The decompression may be implemented in software by performing a test and a conditional branch before each load instruction that accesses a pointer structure. The test reads the first field of the pointer structure and branches to compute the address according to the encoding type 270 and the index 272 stored in the second field of the pointer structure. In one embodiment, a pointer load instruction may be implemented that performs an operation to compute a pointer when the encoding type indicates that the pointer is within the same sub-region (type==0). The pointer load instruction may perform the following operation:

dst=M[sub_region_base index*record_size] if (type)==0 raise exception if (type)==1

The most common case, when the pointer corresponds to another cell in the same sub-region, is performed quickly. In one embodiment, the common case may be 97% of the pointers referenced by a cell. The remaining cases that occur less frequently are handled by an exception handler. Depending on the type 270, the exception handler may access a pointer table 245 or a neighbor pointer table 250 to dereference a pointer, i.e., compute the pointer corresponding to a cell structure. The exception handler loads the pointer into the destination register (dst) and returns. In an alternate embodiment, the load to dereference the pointer may be computed using a conditional branch instruction implemented in software, without raising an exception.

When the pointer structures are encoded to access either the pointer table 245 or the neighbor pointer table 250, the memory access time will vary for the different encoding types. Consider an array of threads processing the cells of the 3D grid of cells 200. Most threads may be processing cells that reference pointers within the same sub-region and are therefore able to complete each pointer dereference with a single memory load. However, a few of the threads (e.g. those associated with the boundary cells of the sub-region) require two memory loads to complete each pointer dereference, and if hierarchical compression is used, three memory loads may be required. When portions of the sub-region structure 220 are cached, the latency incurred to dereference the pointers may vary by larger amounts, as a result of cache hits and misses, resulting in non-uniform memory access times. In some embodiments, the non-uniformity in memory access time may be problematic for applications that have a fixed allocation of threads to grid cells—and where a barrier instruction is used to synchronize execution of all of the threads periodically. Work queues may be employed to alleviate the problem of non-uniform memory access times, by dynamically distributing the grid cells to threads. Threads that execute quickly are able to process additional cells compared with threads that incur higher latency memory accesses when dereferencing pointers.

Figure 3A:
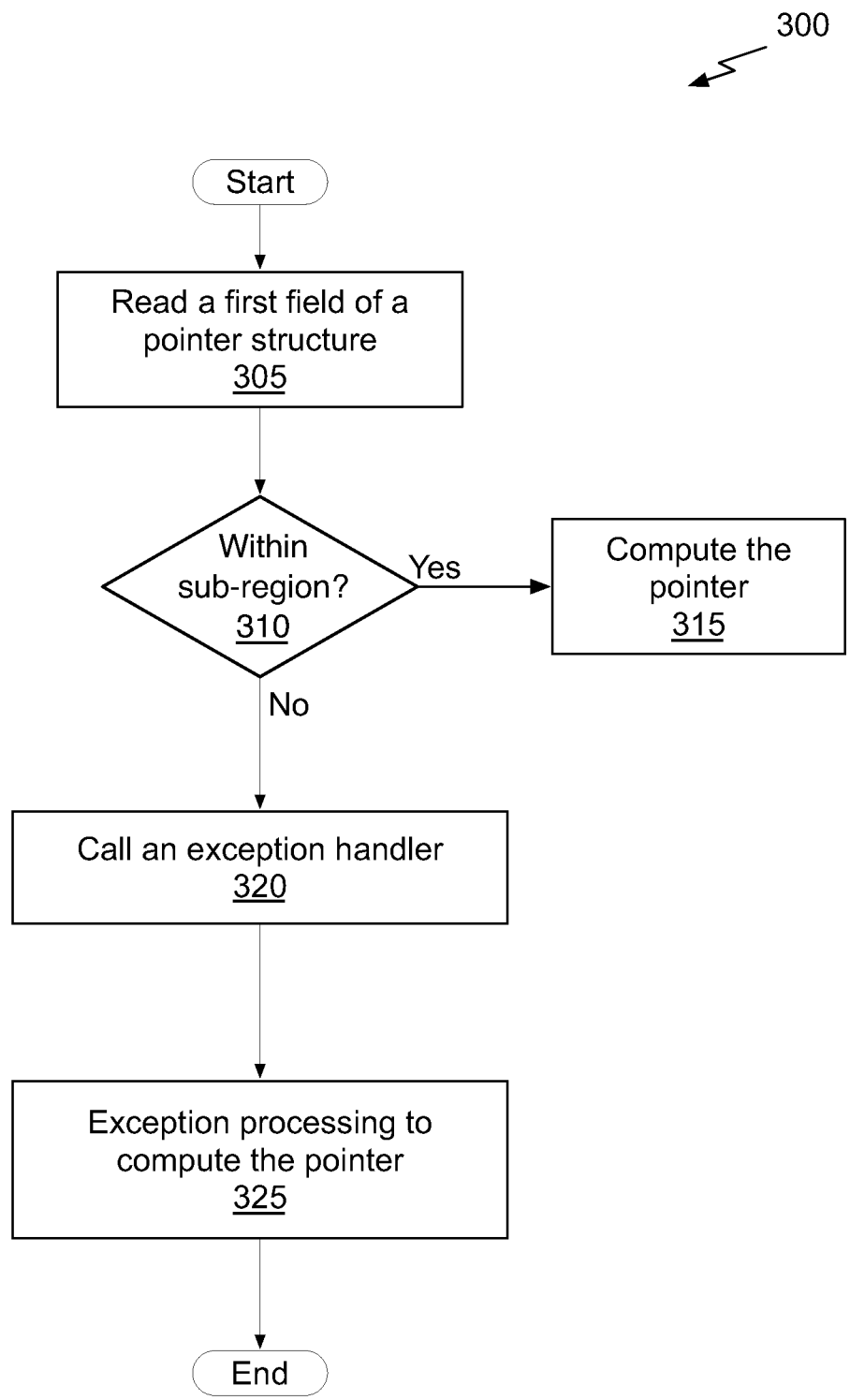
FIG. 3A illustrates a flowchart of a method for executing a load instruction, in accordance with one embodiment.

FIG. 3A illustrates a flowchart of a method 300 for executing a pointer load instruction, in accordance with one embodiment. At operation 305, a processor executing the pointer load instruction reads a first field of the pointer structure to obtain the encoding type 270. At operation 310, the processor determines if the encoding type 270 indicates that the pointer is within the sub-region, and, if so, at operation 315, the processor computes the pointer of another cell structure in the sub-region structure 220. Otherwise, when the encoding type 270 indicates that the pointer is not within the sub-region, at operation 320, the processor calls an exception handler. At operation 325, the exception handler processes the second field to compute the pointer and stores the pointer in a destination register before returning.

Figure 3B:
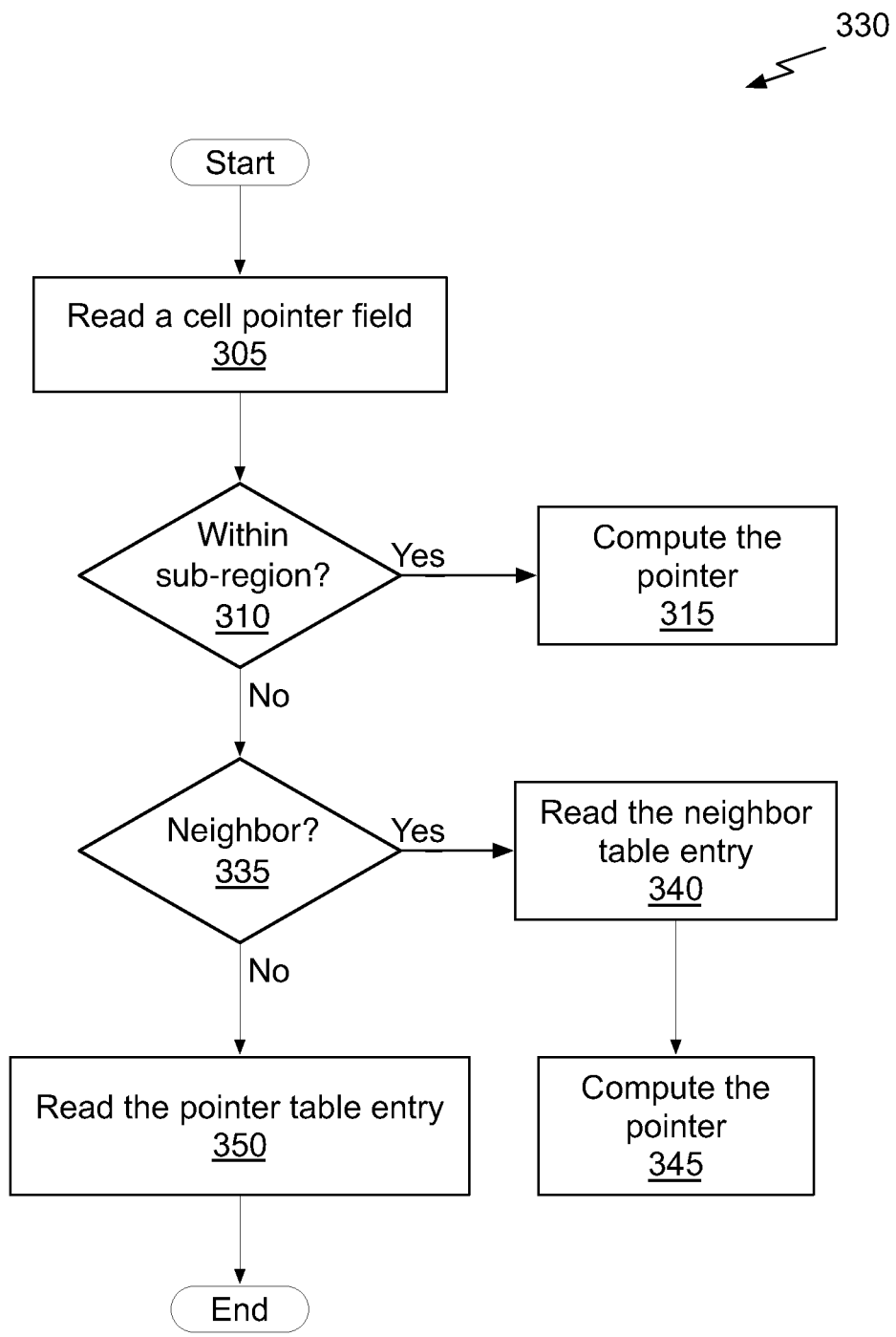
FIG. 3B illustrates a flowchart of a method for determining a pointer for a cell, in accordance with one embodiment.

In one embodiment, a processing unit may include circuitry that is configured to decompress a pointer structure and compute a pointer. FIG. 3B illustrates a flowchart of a method 330 for determining a pointer corresponding to a cell structure, in accordance with one embodiment. At operation 305, the processing unit reads a first field of the pointer structure to obtain the encoding type 270. At operation 310, the processing unit determines if the encoding type 270 indicates that the pointer is within the sub-region, and, if so, at operation 315, the processing unit computes the pointer of another cell structure in the sub-region structure 220.

Otherwise, at operation 335, the processing unit determines if the encoding type 270 indicates that the pointer corresponds to a cell of a neighboring sub-region, and, if so, at operation 340, the processing unit reads an entry in the neighbor pointer table 250 to obtain the identifier 280 and the neighbor index 285. At operation 345, the processing unit computes the pointer based on the identifier 280 and the neighbor index 285. At operation 335, when the encoding type 270 indicates that the pointer does not correspond to a cell of a neighboring sub-region, then at operation 350, the processing unit reads an entry from the pointer table 245 to obtain the pointer.

The encoding of pointers into a compressed format may be implemented entirely in software, in one optional embodiment. A sub-region structure 220 may be read from memory, the pointer structures may be encoded according to two or more different encoding types, and then a modified sub-region structure may be written back to the memory.

Figure 3C:
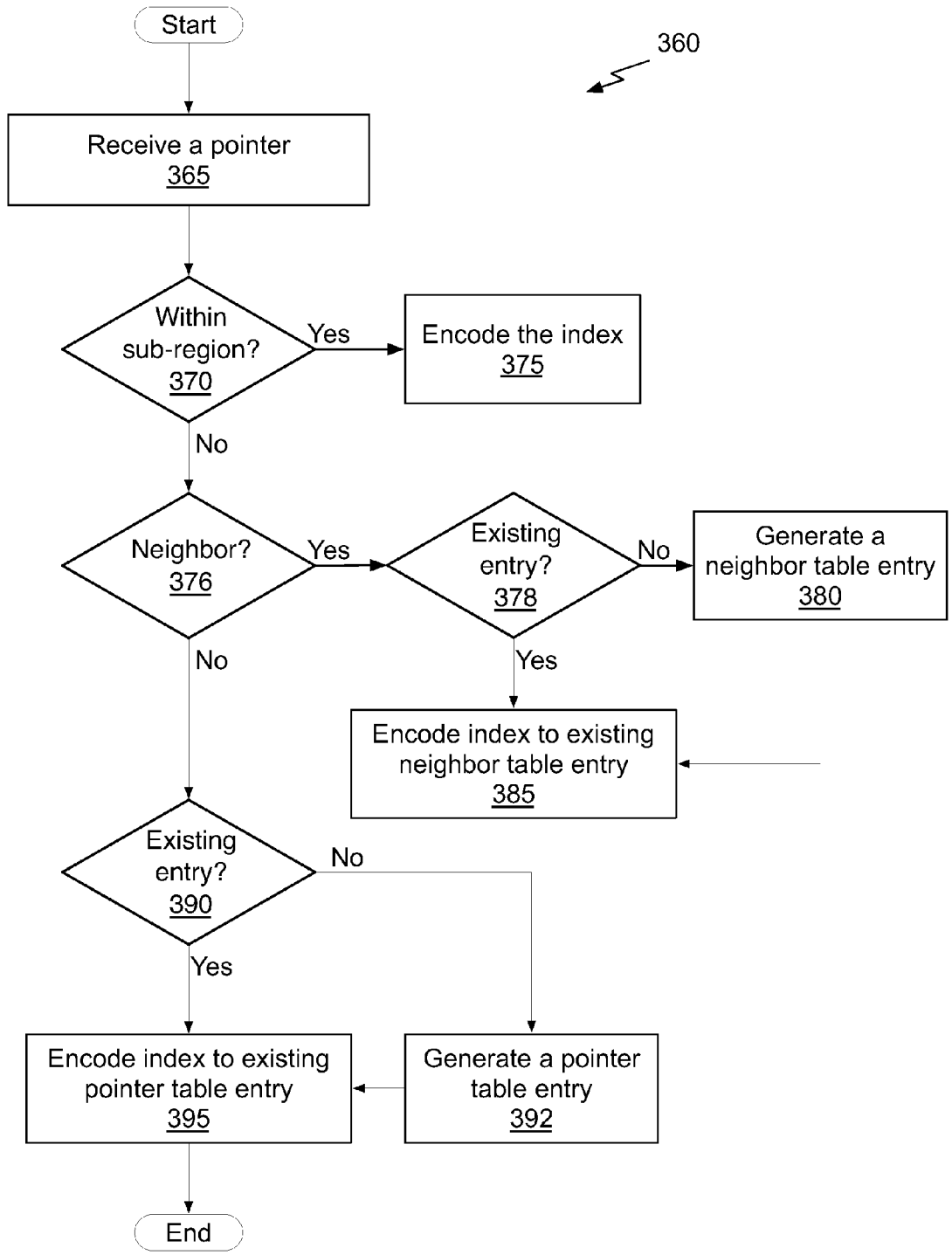
FIG. 3C illustrates a flowchart of a method for encoding a pointer referenced by a cell, in accordance with one embodiment.

An encoding processing unit may include circuitry that is configured to encode a pointer into a pointer structure. FIG. 3C illustrates a flowchart of a method 360 for encoding a pointer referenced by a cell, in accordance with one embodiment. At operation 365, the encoding processing unit receives a pointer (e.g. an uncompressed pointer that is referenced by a cell, etc.). At operation 370, the encoding processing unit determines if the pointer corresponds to a cell structure that is within the sub-region, and, if so at operation 375, the encoding processing unit encodes an index 272 corresponding to the cell structure in the second field of the pointer structure and stores the encoding type 270 in the first field of the pointer structure (indicating that the pointer corresponds to a cell structure that is within the sub-region).

Otherwise, the pointer does not correspond to a cell structure that is within the sub-region, and at operation 376, the encoding processing unit determines if the pointer corresponds to a cell structure that is within a neighboring sub-region, and, if so, at operation 378, the encoding processing unit determines if an existing entry in the neighbor pointer table 250 can be used to encode the pointer. When an existing entry cannot be used, at operation 380, the encoding processing unit generates a new entry in the neighbor pointer table 250 and stores an identifier 280 and a neighbor index 285 in the new entry. At operation 385, the encoding processing unit encodes the index of the pointer structure to point to the existing (or new) entry by storing an index corresponding to the entry of the neighbor pointer table 250 in the second field of the pointer structure. At operation 385, the encoding processing unit also encodes the encoding type 270 in the first field of the pointer structure (indicating that the pointer corresponds to a cell structure that is within a neighboring sub-region).

If, at operation 376, the encoding processing unit determines that the pointer does not correspond to a cell structure that is within a neighboring sub-region, then at operation 390, the encoding processing unit determines if an existing entry in the pointer table 245 can be used to encode the pointer. When an existing entry cannot be used, at operation 392, the encoding processing unit generates a new entry in the pointer table 245 and stores the uncompressed pointer in the new entry. At operation 395, the encoding processing unit encodes the index of the pointer structure to point to the existing (or new) entry by storing an index corresponding to the entry of the pointer table 245 in the second field of the pointer structure. At operation 395, the encoding processing unit also encodes the encoding type 270 in the first field of the pointer structure (indicating that the pointer corresponds to a cell structure that is outside of the sub-region and outside of neighboring sub-regions).

In some circumstances, the pointers may be encoded into a compressed format to reduce memory bandwidth as well to conserve memory capacity. Reducing the amount of memory bandwidth that is consumed also reduces the energy that is consumed to transfer the cell structures between a processing device and the memory. When the conservation of memory bandwidth is more important than reducing the storage consumed by the 3D grid of cells 200, enough memory may be allocated to store the 3D grid of cells 200 assuming that none of the pointer structures are compressed. The pointer structures may then be compressed by software, as previously described. The pointer structures may also be compressed by an encoding processing unit when the pointer structures are written to memory.

Figure 4:
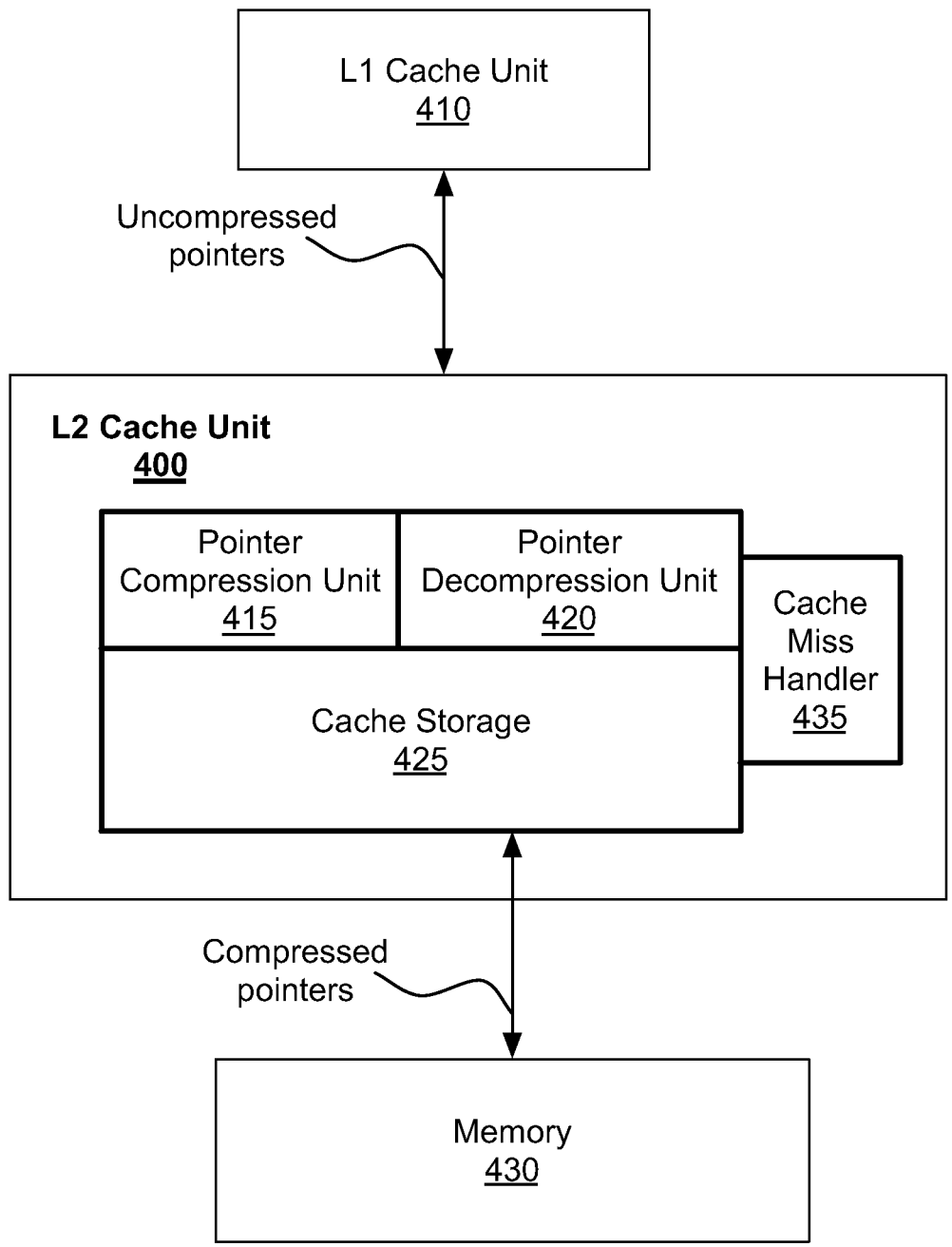
FIG. 4 illustrates a block diagram of a L1 cache unit, an L2 cache unit, and a memory, in accordance with one embodiment.

FIG. 4 illustrates a block diagram of a L1 cache unit 410, an L2 cache unit 400, and a memory 430, in accordance with one embodiment. When a cell structure that includes compressed pointer structures is read from the memory 430, the compressed pointer structures may be stored in the cache storage 425 of the L2 cache unit 400 in the compressed format. When one or more of the compressed pointer structures are transferred to the L1 cache unit 410, a pointer decompression unit 420 may decompress the compressed pointer structures, to provide the L1 cache unit 410 with the uncompressed pointers. The L2 cache unit 400 may cache copies of a pointer table 245 and a neighbor pointer table 250 for one or more of the sub-region structures to aid in the decompression of the pointer structures.

The L1 cache unit 410 may write uncompressed pointers to the L2 cache unit 400 and a pointer compression unit 415 may be configured to encode the uncompressed pointers into compressed pointer structures before they are stored in the cache storage 425 and, if needed, written back to the memory 430.

In one embodiment, the L2 cache unit 400 may be configured to decompress a block of compressed pointers included within a set of cell structures that are loaded from the memory 430 and store the decompressed pointers in the cache storage 425. A pointer decompress instruction may be used to load and decompress the block of compressed pointers. In one embodiment, the pointer decompress instruction is a cache prefetch instruction that loads the block into the cache storage 425 at the current address for the set of cell structures, decompressing the pointer structures as they are written into the cache storage 425. When one or more pointers within a cell structure are modified, a copy and compress store instruction may be used to encode the pointers before the uncompressed pointers are written back to the memory 430 by the L2 cache unit 400. In general, the pointer compression unit 415 and pointer decompression unit 420 may be implemented at any cache or interface between the memory 430 and a processing unit that uses the pointers in the uncompressed format. In other words, the pointer compression unit 415 and pointer decompression unit 420 may be implemented in the L1 cache unit 410, the L2 cache unit 400, and/or the memory 430.

In one embodiment, a cache miss handler 435 may be configured to decompress pointer structures for defined windows of the address space as a cache line is loaded into the cache storage 425 from memory 430 or as a cache line is loaded into the L1 cache unit 410 from the cache storage 425. The memory addresses that store cell structures including compressed pointers may be identified via a bit in the page descriptor or via registers that identify the base and length of addresses storing compressed pointers. If a cache line holding decompressed pointers becomes dirty (because one of the pointers is modified), the cache line should be encoded into a compressed format when it is copied back to memory 430 upon eviction. Ideally, a block of cache lines is evicted as a unit so that the block size matches a memory transaction size.

Figure 5:
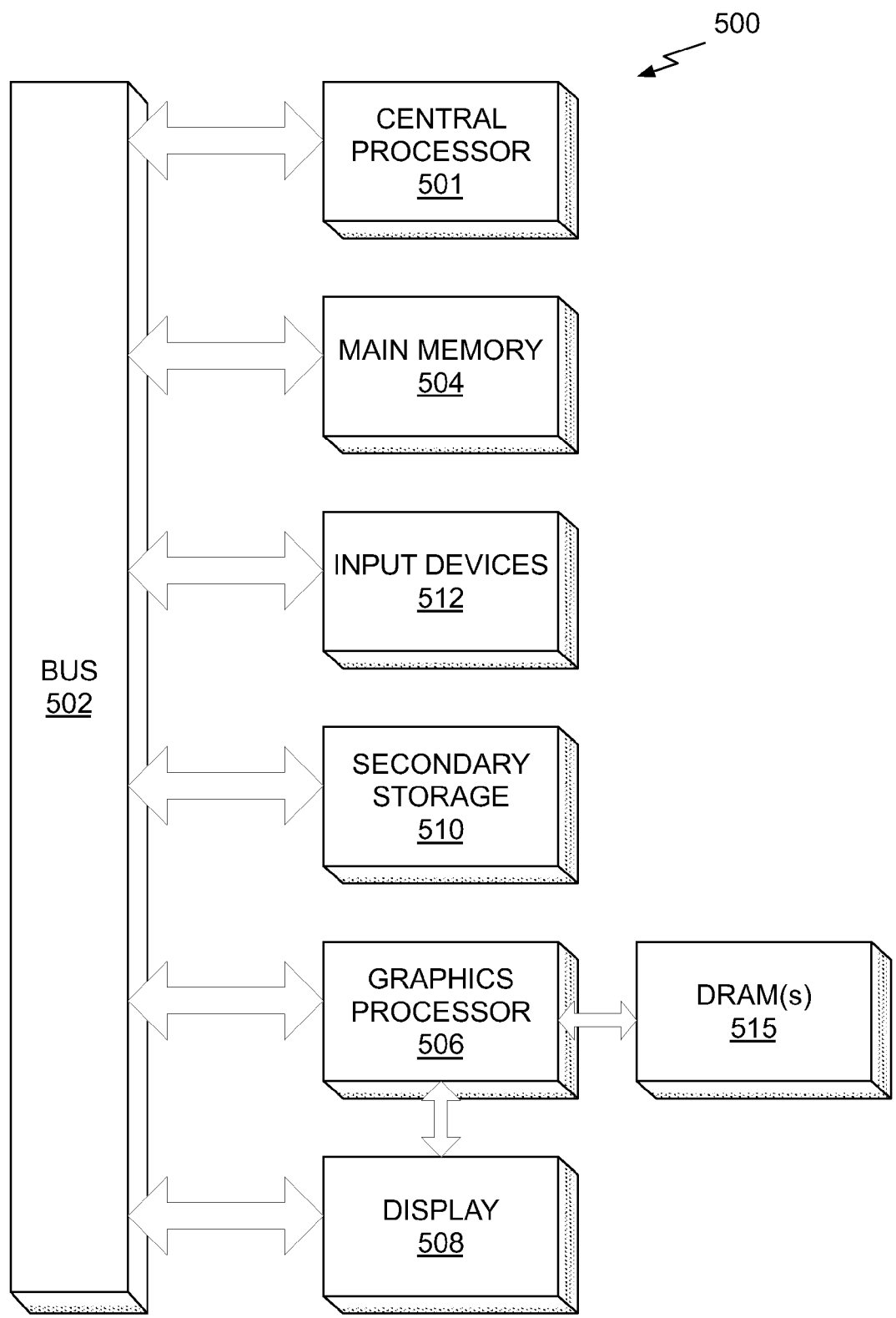
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU). The graphics processor 506 may be coupled to one or more DRAM devices 515 and may be configured to refresh different regions of the DRAM(s) at different rates based on characterization information. In one embodiment, the central processor 501 is coupled to one or more DRAM devices 515 and is configured to refresh different regions of the DRAM(s) at different rates based on characterization information. The DRAM 515 may be implemented as the DRAM 280 in FIG. 2.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5, may be incorporated in the system 500 to provide power to one or more of the chips.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    determining an encoding type for a first pointer structure referenced by a first cell of a data structure;
    encoding a first field of the first pointer structure to indicate the encoding type; and
    encoding a second field of the first pointer structure according to the encoding type to indicate a location in memory where a cell structure corresponding to a second cell of the data structure is stored;
    wherein the encoding type indicates a length of an index that is used to compute the location in the memory.

2. The method of claim 1, wherein a first encoding type indicates that the first cell and the second cell are both within a sub-region of the data structure.

3. The method of claim 2, wherein the second field stores the index which corresponds to an offset within a portion of the memory storing cell structures of cells that are within the sub-region.

4. The method of claim 1, wherein a second encoding type indicates that the first cell is within a first sub-region of the data structure and the second cell is outside of the first sub-region of the data structure.

5. The method of claim 4, wherein the second field stores the index which corresponds to an entry of a table storing an uncompressed pointer to the location in memory.

6. The method of claim 1, wherein the length of the index varies based on a level of hierarchy within the data structure.

7. The method of claim 1, wherein the data structure is an irregular grid.

8. The method of claim 1, wherein the data structure is a graph.

9. The method of claim 1, wherein an address of the location in the memory is 63 bits and a number of bits in the second field is 15 bits.

10. The method of claim 1, wherein a third encoding type indicates that the first cell is within a first sub-region of the data structure and the second cell is within a second sub-region of the data structure.

11. A method, comprising:
   determining an encoding type for a first pointer structure referenced by a first cell of a data structure;
   encoding a first field of the first pointer structure to indicate the encoding type; and
   encoding a second field of the first pointer structure according to the encoding type to indicate a location in memory where a cell structure corresponding to a second cell of the data structure is stored;
   wherein a third encoding type indicates that the first cell is within a first sub-region of the data structure and the second cell is within a second sub-region of the data structure;
   wherein the second field stores an index corresponding to an entry of a table storing a location of the second sub-region.

12. The method of claim 11, wherein the entry stores an identifier of the second sub-region and an offset within a portion of the memory storing cell structures of cells that are within the second sub-region.

13. A non-transitory computer-readable medium storing instructions that, when executed by a processor, cause the processor to perform the steps of:
   determining an encoding type stored in a first field of a first pointer structure that is referenced by a first cell of a data structure, wherein the encoding type indicates that a pointer references a second cell within a sub-region of the data structure that includes the first cell; and
   computing the pointer based on a second field of the first pointer structure and according to the encoding type, wherein the pointer indicates a location in memory where a cell structure corresponding to the second cell of the data structure is stored;
   wherein the encoding type indicates a length of an index that is used to compute the location in the memory.

14. The non-transitory computer-readable medium of claim 13, further comprising:
   determining a second encoding type stored in a first field of a second pointer structure that is referenced by the first cell of the data structure, wherein the second encoding type indicates that a second pointer references a third cell that is outside of the sub-region of the data structure.

15. The non-transitory computer-readable medium of claim 14, further comprising calling an exception handler to compute the second pointer.

16. The non-transitory computer-readable medium of claim 13, wherein the second field stores an index corresponding to an offset within a portion of the memory storing cell structures of cells that are within the sub-region.

17. The non-transitory computer-readable medium of claim 13, further comprising:
   reading a block of compressed pointers from the memory; and
   decompressing the block of compressed pointers to generate decompressed pointers; and
   storing the decompressed pointers in a cache storage.

18. The non-transitory computer-readable medium of claim 13, further comprising:
   receiving the pointer;
   determining that the pointer references the second cell within the sub-region;
   storing the encoding type in the first field of the first pointer structure to indicate that the second field stores an index corresponding to the second cell; and
   storing the index in the second field of the first pointer structure.

19. A system, comprising:
   a memory; and
   a pointer compression unit that is coupled to the memory and configured to:
      determine an encoding type for a pointer structure referenced by a first cell of a data structure;
      encode a first field of the pointer structure to indicate the encoding type; and
      encode a second field of the pointer structure according to the encoding type to indicate a location in the memory where a cell structure corresponding to a second cell of the data structure is stored;
      wherein the encoding type indicates a length of an index that is used to compute the location in the memory.

20. The system of claim 19, further comprising a pointer decompression unit that is coupled to the memory and configured to:
   receive the pointer structure;
   determine the encoding type stored in the first field; and
   compute the location in the memory where the cell structure corresponding to the second cell is stored based on the encoding type and the second field of the pointer structure.

21. The system of claim 20, wherein the pointer compression unit and the pointer decompression unit are included within a cache unit that is coupled between the memory and a processing unit, and further comprising a cache miss handler that is configured to decompress pointer structures when a cache line is loaded into the cache from the memory.

* * * * *